United States Patent [19]

Li et al.

[11] 4,091,199
[45] May 23, 1978

[54] ACRYLONITRILE-VINYL ETHER-INDENE OR COUMARONE POLYMERS

[75] Inventors: George S. Li, Aurora; Gary W. Dirks, Bedford Heights, both of Ohio

[73] Assignee: The Standard Oil Company, Cleveland, Ohio

[21] Appl. No.: 752,162

[22] Filed: Dec. 20, 1976

[51] Int. Cl.$^2$ .................. C08F 214/14; C08F 214/18; C08F 222/30; C08F 244/00
[52] U.S. Cl. .................................... 526/280; 526/248; 526/267; 526/268
[58] Field of Search ................ 526/248, 267, 268, 280

[56] References Cited

U.S. PATENT DOCUMENTS

| | | | |
|---|---|---|---|
| 3,926,871 | 12/1975 | Hensley | 260/80.72 |
| 3,926,926 | 12/1975 | Li et al. | 260/85.5 B |

*Primary Examiner*—Stanford M. Levin
*Attorney, Agent, or Firm*—John F. Jones; Larry W. Evans

[57] ABSTRACT

Polymer resins which are relatively high softening and function as gas and vapor barrier materials are composed of an olefinically unsaturated nitrile, such as acrylonitrile, a vinyl ether, such as butyl vinyl ether, and indene or coumarone.

4 Claims, No Drawings

ACRYLONITRILE-VINYL ETHER-INDENE OR COUMARONE POLYMERS

The present invention relates to novel polymeric compositions which have low permeability to gases, and high-softening temperatures, and more particularly pertains to high-softening compositions which function as gas and vapor barrier materials and are composed of the essential components of an olefinically unsaturated nitrile, a vinyl ether, and indene, and to a process for preparing them.

The novel polymeric products of the present invention are prepared by polymerizing a major proportion of an olefinically unsaturated nitrile, such as acrylonitrile, and a minor proportion of a vinyl ether, such as butyl vinyl ether, and indene.

The olefinically unsaturated nitriles useful in this invention are the alpha, beta-olefinically unsaturated mononitriles having the structure

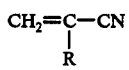

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The preferred olefinically unsaturated nitrile in the present invention is acrylonitrile.

The vinyl ethers useful in this invention are preferably the lower alkyl vinyl ethers having the structure

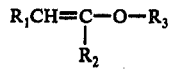

wherein $R_1$ and $R_2$ independently are hydrogen or a lower alkyl group having from 1 to 4 carbon atoms, and $R_3$ is an alkyl group having from 1 to 6 carbon atoms. Compounds of this type include methyl vinyl ether, methyl isopropenyl ether, ethyl vinyl ether, the propyl vinyl ethers, the butyl vinyl ethers, the amyl vinyl ethers, and the hexyl vinyl ethers including cyclohexyl vinyl ether. Most preferred are the vinyl ethers in which $R_1$ and $R_2$ are hydrogen and $R_3$ is an alkyl group having from 1 to 5 carbon atoms.

Indene (1-H-indene) and coumarone (2,3-benzofuran) and mixtures thereof are useful as monomers in the present invention. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is polymerization in an aqueous medium by emulsion or suspension techniques. The polymerization is preferably carried out in an aqueous medium in the presence of an emulsifier or suspending agent and a free-radical generating polymerization initiator at a temperature of from about 0° to 100° C in the substantial absence of molecular oxygen.

The preferred polymeric compositions embodied herein are those resulting from the polymerization of (A) about 60 to 90% by weight of at least one nitrile having the structure

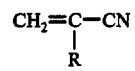

wherein R has the foregoing designation, (B) from 5 to 39% by weight of a vinyl ether having the structure

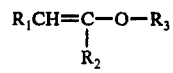

wherein $R_1$, $R_2$ and $R_3$ have the foregoing designations, and (C) from 1 to 20% by weight of at least one member selected from the group consisting of indene and coumarone wherein the given percentages of (A), (B) and (C) are based on the combined weights of (A), (B) and (C).

More specifically, the present invention can be illustrated in the polymerization of a mixture of acrylonitrile, butyl vinyl ether and indene to produce a product having excellent impermeability to gases and vapors and improved ASTM heat-distortion temperature when compared to the prior art acrylonitrile-butyl vinyl ether copolymer. More preferably, the acrylonitrile-butyl vinyl ether-indene monomer component should contain 70 to 90% by weight of acrylonitrile, 5 to 29% by weight of butyl vinyl ether and 1 to 15% by weight of indene.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, injection molding, injection blow molding, etc. The polymeric products of this invention have excellent solvent resistance, and their low permeability to gases and vapors make them useful in the packaging industry, and they are particularly useful in the manufacture of bottles, film, sheets, and other types of containers for liquids and solids.

In the following illustrative examples, the amounts of ingredients are expressed in parts by weight unless otherwise indicated.

EXAMPLE 1

A. A terpolymer of acrylonitrile, indene and n-butyl vinyl ether was prepared from the following ingredients:

| Ingredient | Parts |
| --- | --- |
| water | 300 |
| acrylonitrile | 75 |
| indene | 5 |
| n-butyl vinyl ether | 20 |
| n-dodecyl mercaptan | 0.05 |
| $K_2S_2O_8$ | 0.2 |
| Gafac RE-610 emulsifier* | 3.0 |

*A mixture of R-O-($CH_2CH_2O$-)$_n$PO$_3M_2$ and [R-O-($CH_2CH_2O$-)$_n$]$_2$PO$_2$M wherein n is a number from 1 to 40, R is an alkyl or alkaryl group, and M is hydrogen, ammonia, or an alkali metal, produced by GAF Corporation.

The combined ingredients were polymerized at 60° C for about 20 hours in the substantial absence of molecular oxygen (nitrogen atmosphere) with continuous agitation. The resulting resin was recovered from the final latex by coagulation, washing and drying. The final resin was found to have an ASTM heat-distortion temperature (264 psi) of 65° C.

B. A repeat of A above except that no indene and 25 parts of n-butyl vinyl ether were used gave a resin which is outside the scope of this invention, and it had an ASTM heat-distortion temperature of 49° C.

EXAMPLE 2

The procedure of Example 1A was repeated except that 20 parts of indene and 5 parts of n-butyl vinyl ether were employed. The resulting resin was found to have an ASTM heat-distortion temperature of 94° C.

EXAMPLE 3

A. The procedure of Example 1A was repeated except that 70 parts of acrylonitrile, 15 parts of indene and 15 parts of n-butyl vinyl ether were employed. The final resin was found to have an ASTM heat-distortion temperature of 72° C and an oxygen transmission rate of 6.3 cc/100 inches$^2$/24 hours/atmosphere.

B. The procedure of Example 1B was repeated using 70 parts of acrylonitrile and 30 parts of n-butyl vinyl ether. The resin was found to have an ASTM heat-distortion temperature of 52° C and an oxygen transmission rate of 26.9 cc/100 inches$^2$/24 hours/atmosphere.

EXAMPLE 4

The procedure of Example 3A was repeated using 5 parts of indene and 25 parts of n-butyl vinyl ether. The final resin was found to have an ASTM heat-distortion temperature of 56° C.

EXAMPLE 5

A. The procedure of Example 1A was repeated using 65 parts of acrylonitrile, 10 parts of indene and 25 parts of n-butyl vinyl ether. The final resin was found to have the following properties:

| | |
|---|---|
| ASTM heat-distortion temperature | 59° C |
| flexural strength | 14.9 × 10$^3$ psi |
| flexural modulus | 4.32 × 10$^5$ psi |
| tensile strength | 10.7 × 10$^3$ psi |
| Rockwell hardness (M) | 59 |

B. A repeat of A above except that no indene and 35 parts of n-butyl vinyl ether were employed gave a resin which is outside the scope of this invention which had the following properties:

| | |
|---|---|
| ASTM heat-distortion temperature | 46° C |
| flexural strength | 9.5 × 10$^3$ psi |
| flexural modulus | 3.43 × 10$^5$ psi |
| tensile strength | 7.7 × 10$^3$ psi |
| Rockwell hardness (M) | 16 |

EXAMPLE 6

A. The procedure of Example 1A was repeated using 60 parts of acrylonitrile, 5 parts of indene and 35 parts of n-butyl vinyl ether. The resulting resin was found to have the following properties:

| | |
|---|---|
| ASTM heat-distortion temperature | 48° C |
| flexural strength | 10.7 × 10$^3$ psi |
| flexural modulus | 3.77 × 10$^5$ psi |
| tensile strength | 8.9 × 10$^3$ psi |
| Rockwell hardness (M) | 30 |

B. A repeat of A above in which 20 parts of indene and 20 parts of n-butyl vinyl ether were employed gave a resin having the following properties:

| | |
|---|---|
| ASTM heat-distortion temperature | 74° C |
| flexural strength | 10.4 × 10$^3$ psi |
| flexural modulus | 4.07 × 10$^5$ psi |
| tensile strength | 9.3 × 10$^3$ psi |
| Rockwell hardness (M) | 81 |

C. The procedure of A above was repeated except that no indene and 40 parts of n-butyl vinyl ether were employed and gave a resin which is outside the scope of this invention which had the following properties:

| | |
|---|---|
| ASTM heat-distortion temperature | 44° C |
| flexural strength | 8.5 × 10$^3$ psi |
| felxural modulus | 3.2 × 10$^5$ psi |
| tensile strength | 7.2 × 10$^3$ psi |
| Rockwell hardness (M) | 16 |

EXAMPLE 7

The repeat of Example 6 wherein methyl vinyl ether, ethyl vinyl ether and isopropyl vinyl ether were each used in place of n-butyl vinyl ether gave similar results.

We claim:

1. The thermoplastic polymer composition resulting from the polymerization in an aqueous medium with free-radical initiation at a temperature in the range of from 0° to 100° C and in the substantial absence of molecular oxygen a mixture of
   (A) from about 60 to 90% by weight of at least one nitrile having the structure $$CH_2=C-CN$$
   $$\underset{R}{|}$$

wherein R is hydrogen, a lower alkyl group having from 1 to 4 carbon atoms, or a halogen, and
   (B) from about 5 to 39% by weight of a vinyl ether having the structure $$R_1CH=C-O-R_3$$
   $$\underset{R_2}{|}$$

wherein $R_1$ and $R_2$ independently are hydrogen or a lower alkyl group having from 1 to 4 carbon atoms, and $R_3$ is an alkyl group having from 1 to 6 carbon atoms, and
   (C) from about 1 to 20% by weight of at least one member selected from the group consisting of indene and coumarone wherein the given percentages of (A), (B) and (C) are based on the combined weights of (A), (B) and (C).

2. The composition of claim 1 wherein (A) is acrylonitrile.

3. The composition of claim 2 wherein (B) is butyl vinyl ether.

4. The composition of claim 3 wherein (C) is indene.

* * * * *